United States Patent
Madsak et al.

(10) Patent No.: US 6,825,434 B2
(45) Date of Patent: Nov. 30, 2004

(54) METHOD FOR WELDING A BOLT ONTO A WORKPIECE AND A BOLT-WELDING DEVICE

(75) Inventors: Jürgen Madsak, Breckerfeld (DE); Ulrich Citrich, Gevelsberg (DE); Steffen Hailer, Bochum (DE)

(73) Assignee: Nelson Bolzenschweiss-Technik GmbH & Co. KG, Geverlsberg (DE)

( * ) Notice: Subject to any disclaimer, the term of this patent is extended or adjusted under 35 U.S.C. 154(b) by 38 days.

(21) Appl. No.: 10/203,953

(22) PCT Filed: Feb. 21, 2001

(86) PCT No.: PCT/DE01/00665

§ 371 (c)(1),
(2), (4) Date: Nov. 5, 2002

(87) PCT Pub. No.: WO01/62425

PCT Pub. Date: Aug. 30, 2001

(65) Prior Publication Data

US 2003/0141346 A1    Jul. 31, 2003

(30) Foreign Application Priority Data

Feb. 21, 2000   (DE) ........................ 100 07 836

(51) Int. Cl.⁷ ............................................ B23K 9/20
(52) U.S. Cl. ............................................ 219/99; 219/98
(58) Field of Search ...................................... 219/98, 99

(56) References Cited

U.S. PATENT DOCUMENTS

| | | | | |
|---|---|---|---|---|
| 2,256,480 A | * | 9/1941 | Hughes .................... | 219/98 |
| 2,467,723 A | * | 4/1949 | Frederick .................. | 219/98 |
| 3,414,699 A | | 12/1968 | Neumeier et al. ........... | 219/95 |
| 4,002,876 A | * | 1/1977 | Wieland, Jr. ............... | 219/98 |

FOREIGN PATENT DOCUMENTS

| | | |
|---|---|---|
| GB | 2268900 A | 1/1994 |
| JP | 11245038 A | 9/1999 |

\* cited by examiner

*Primary Examiner*—Clifford C. Shaw
(74) *Attorney, Agent, or Firm*—Howard & Howard

(57) ABSTRACT

The invention relates to a method for welding a bolt (19) onto a workpiece, using a bolt-welding device and to a bolt-welding device. A force is applied to the drive shaft (11) using a switchable unit (29), said force exerting a resistance against a displacement of the drive shaft (11). The drive shaft (11) is moved by an electromagnetic linear drive (5) acting in an axial direction. The unit (29) can prevent the movement of the drive shaft (11) and can fix the latter in position, in such a way that the linear drive (5) can be switched to a currentless state. In addition, the unit can dampen the movement of the drive shaft (11).

30 Claims, 2 Drawing Sheets

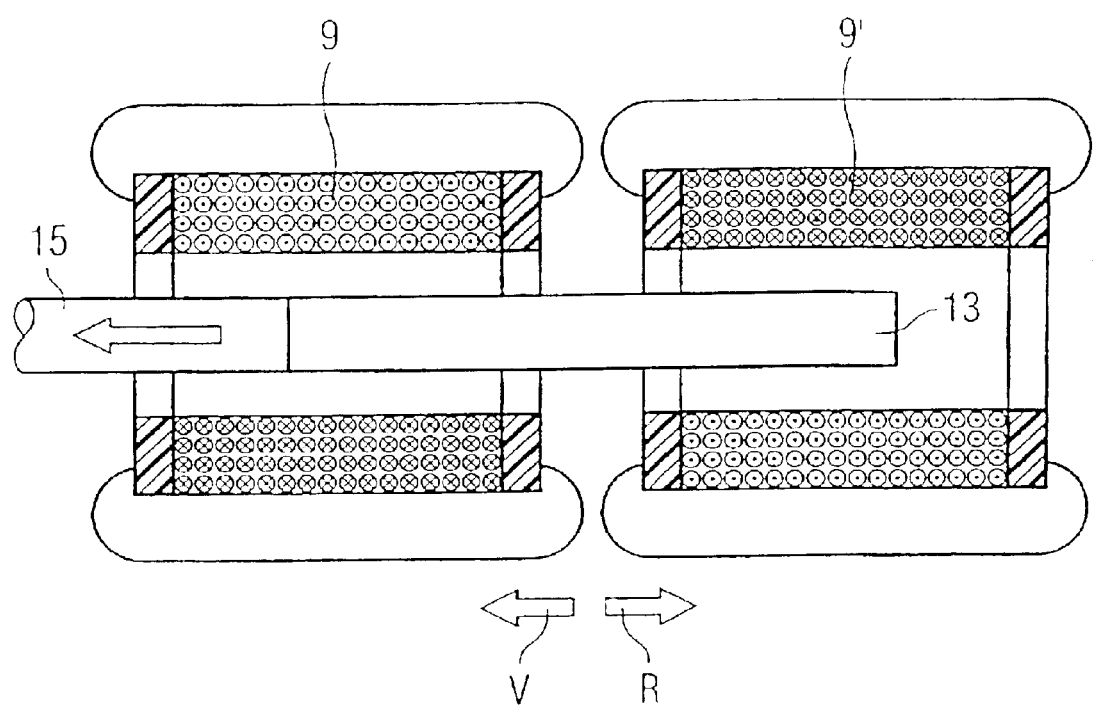

METHOD FOR WELDING A BOLT ONTO A WORKPIECE AND A BOLT-WELDING DEVICE

RELATED APPLICATIONS

This application is a National Stage application of PCT/DE01/00665, filed Feb. 21, 2001, which was not published in English under PCT Article 21(2). The present application claims priority under 35 U.S.C. §119 of German Application No. 10007836.2, filed Feb. 21, 2000.

The invention relates to a method for welding a bolt onto a work piece by means of a bolt-welding device having at least one drive shaft connected to the bolt to be welded and at least one electromagnetic linear drive acting in axial direction with at least one coil.

A weld-on method is known from DE 43 24 223 A1, for example. In this case, two electromagnetic driving devices acting in opposite directions are provided, one acting in forward direction and the other in the opposite direction. If the drive shaft has to be repositioned, the drive acting in forward direction, which is the stronger anyway, will apply such a force to the drive shaft as to cause a displacement of the drive shaft, while the other linear drive also acts during the displacement. Because the two linear drives act against each other, a balance of forces is required for fixing a position, but this means that considerable electric energy must be available, which leads to an increase in the heat development, especially when the drive shaft is in slanted position.

Therefore, it is suggested by DE 195 29 350 to always activate only one of the two linear drives at any one time. Using this method, it is difficult to quickly and securely move the drive shaft to intermediate positions between the starting position (drive shaft fully retracted) and the end position (drive shaft fully extended). It causes a so-called transient behavior of the drive shaft around the target position. Moreover, the drive shaft may also oscillate in certain welding positions (trough or overhead positions).

The invention provides a method and a device, especially for performing the method, which are simple and ensure that the drive shaft is positioned quickly and precisely. Moreover, few heat problems will be encountered with the method of the invention and with the device of the invention. Also, the reproducibility of the welding process is improved for all welding positions.

According to the method of the invention, when the drive shaft is positioned a selectively switchable force is applied to the drive shaft by means of creating a structural path of flux between the drive shaft and the housing, where the force exerts a resistance against displacing the drive shaft, at least in forward direction. According to the method of the invention, the housing and the drive shaft can be structurally coupled directly or indirectly, i.e. mechanically, and a force can be applied to the drive shaft via said coupling which exerts a resistance against displacing the drive shaft, at least in forward direction. This clearly sets the invention apart from the methods intending to position the drive shaft by means of two electromagnetic linear drives acting in opposite direction and from the methods where a spring permanently applies a restoring force. According to the invention, the resistance is used to position the drive shaft or to facilitate positioning. For example, the resistance can dampen the movement to a target position so that the so-called transient oscillation into the target position is reduced or fully prevented. By means of the switchable force, the drive shaft can be securely fixed in position even in the retracted starting position, i.e. the electromagnetic drive system can be switched to an approximately or completely currentless state, which, in turn, reduces the heat development.

Moreover, the drive shaft can be held in any other position, specifically in intermediate positions between the starting and end positions, by means of the switchable force.

In said intermediate positions, the electromagnetic linear drive can then also be currentless.

The level of the force is preferably variable. Because the force is adjustable, it is possible to selectively exert a resistance against the displacement of the drive shaft so as to dampen its movement or prevent movement, which means that the drive shaft is securely fixed in position by means of said force.

The gravity of the drive shaft and the movable parts coupled to the drive shaft can be partially or fully compensated by means of said force. When working overhead, for example, i.e. when the drive shaft is directed upward with the bolt to be welded in front, the force prevents the drive shaft from sliding backward and downward as a result of its own weight. When the drive shaft is directed downward with the bolt in front, such a force can be applied to the drive shaft against the forward direction that said force compensates at least partially or even fully the displacement force caused by the weight of the drive shaft and the parts that are moved together with the drive shaft. Therefore, the electromagnetic linear drive has to consume less electric power.

As explained above, the linear drive should preferably be supplied with less electric energy when the force is connected than when the force is not connected so as to reduce the required driving energy.

The force can be a clamping force, for example, applied between the drive shaft and a part mounted to the housing, which includes the housing itself. For example, a hydraulic, pneumatic or even an electric drive, for example in the form of a lifting magnet, is suitable.

The force can be directed transverse to or opposite the forward direction. In the latter case, the force could also define a restoring force to a starting position.

According to an embodiment of the invention, the force is apportioned relative to the forward force of the linear drive such that it has a dampening function when the drive shaft is moved to a target position.

In addition, the invention relates to a bolt-welding device, especially for performing the method of the invention, having at least one drive shaft connected to the bolt to be welded, an electromagnetic linear drive acting in axial direction with at least one coil, where the drive shaft is part of the linear drive. The bolt-welding device of the invention is characterized in that a switchable device is provided on the drive shaft or the housing and engaging on the housing or the drive shaft when connected, applying a force to the drive shaft and exerting a resistance against a displacement of the drive shaft, at least in forward direction.

As explained above in relation to the method, the device can preferably change the level of the resistance.

According to an embodiment of the invention, said device is a clamping device acting transversely to the drive shaft, for example in the form of a hydraulic or pneumatic piston-cylinder drive.

When the piston-cylinder drive is coupled with a valve which is able to switch the cylinder to a depressurized state, then the drive cannot exert a resistance or it can exert only a very marginal resistance against displacement.

According to another embodiment of the invention, a position measuring system and a control system are provided where the control system is coupled to the position measuring system and is able to drive the device. The position measuring system can determine whether the drive shaft is slanted relative to the horizontal plane. The position measuring system has a double function in this case. As soon as a slanted position is detected the device can be controlled such that it counteracts a displacement of the shaft and/or compensates the effect of the weight of the shaft.

Other features and advantages of the invention are found in the description below and in the enclosed referenced drawings that show the following:

FIG. 3 is an axial section of the linear drive of the bolt-welding device of FIG. 1.

Figure 1:
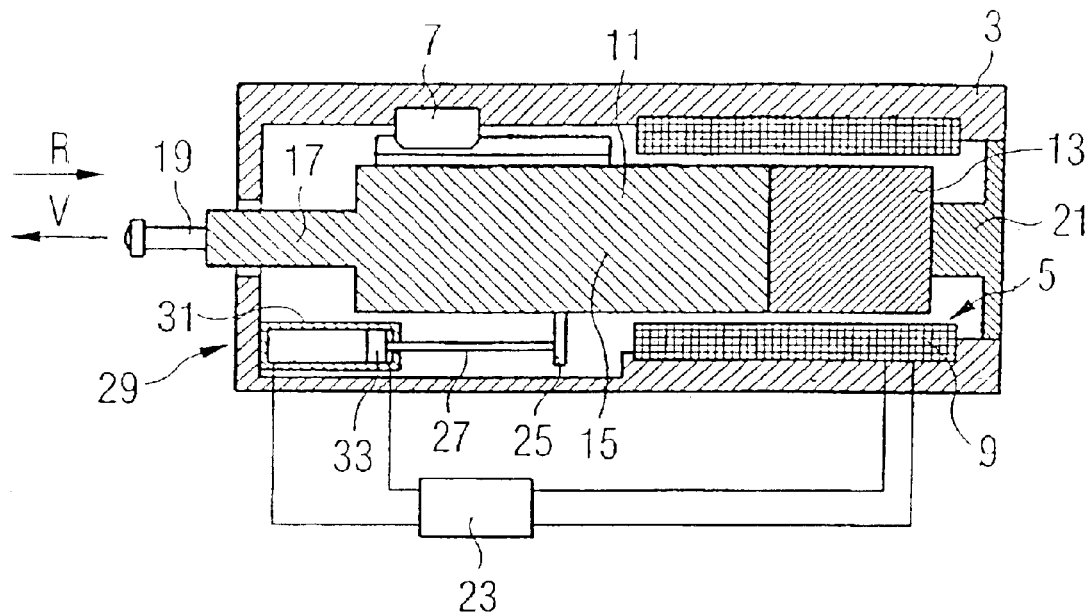
FIG. 1 is an axial section through a first embodiment of the bolt-welding device of the invention operating in accordance with the method of the invention.

FIG. 1 shows a bolt-welding device, more specifically a stylized illustration of the welding tool of a bolt-welding device comprising a housing 3, an electromagnetic linear drive 5 acting in axial direction provided in the housing 3 and a position measuring system 7. The control system for the bolt-welding device is not shown. The linear drive 5 consists of one or more cylindrical coils 9 mounted in the housing 3 and a drive shaft 11 extending into the interior of the coils 9, but projecting out of same. The drive shaft 11 consists of several sections, specifically a rear section 13 in the form of one or more permanent magnets disposed in a row and an elongated cylindrical section 15 joining the rear section 13 and having a front side configured as a bolt holder 17.

A bolt 19 to be welded is inserted and held by the bolt holder 17.

The linear drive 5 that operates in accordance with the principle of a plunger-type coil can have several coils, as shown in FIG. 3, for example two coils 9, 9' connected in series having different winding directions so as to create two electromagnets with opposite directions of magnetic flux, such as described in U.S. Pat. No. 5,321,226, for example. The permanent magnet on the rear section 13 projects into both coils 9, 9' and is movable in both directions by means of the coils 9, 9'.

In the so-called starting position of the drive shaft 11 shown in FIG. 1, the drive shaft 11 is in fully retracted position in which it abuts on a stop 21 on the face.

The position measuring system 7 is provided for detecting the position of the drive shaft 11. The position measuring system 7 is in connection with a control unit 23.

In the area of section 15 of the drive shaft, a piston rod 27 of a piston-cylinder unit 29 engages on the drive shaft 11 via a flange 25. The cylinder mounted on the housing is referenced 31, and 33 refers to the piston. The piston-cylinder unit 29 is a hydraulic or pneumatic unit 29 acting as a selectively switchable device. The direction in which the piston-cylinder unit 29 acts is the forward direction V or the reverse direction R, depending on the switch position. The piston-cylinder unit 29 can be operated via a control unit 23 which can comprise a valve, for example a servo pressure control valve. The piston-cylinder unit 29 creates a structural path of flux between the drive shaft 11 and the housing 3. The piston-cylinder unit 29 can assume several functions, for example forming a dampening device with which the drive shaft is positioned faster and more precisely.

In addition, it can also move the drive shaft 11 in direction R when the linear drive 5 is actuated accordingly, or it can exert a variable counterforce to the linear drive 5.

The position measuring system 7 is coupled with the control unit 23 such and the control unit 23 is configured such that it can detect via the position measuring system 7 whether the drive shaft 11 is moving on the horizontal plane or whether it is slanted relative to the horizontal plane which would cause the weight of the drive shaft and the associated parts mounted on the shaft (in the present case the bolt 19) to displace the drive shaft 11.

The bolt-welding device illustrated in FIG. 1 operates as follows:

The welding device is delivered to a work piece, which is not shown, for example a metal sheet for a vehicle. While the welding device is delivered, which can be a welding head mounted on the arm of a robot, for example, the drive shaft 11 can be in the starting position shown in FIG. 1. In said position, the drive shaft is held solely by the piston-cylinder unit so that the coils 9 are currentless or have a low flow of current, and therefore no force or only a minimal force is generated in forward direction. Therefore, in non-actuated state, the heat development is very minor. When the robot has delivered the welding device close to the work piece, the drive shaft 11 is moved in forward direction V until the tip of the welding bolt 19 contacts the surface of the work piece. During this process, the coils 9 are set under voltage and the cylinder is switched to a depressurized state so as to exert virtually no resistance against displacing the drive shaft 11. A certain minimum resistance can be useful, however, for example when the drive shaft 11 is directed downward with the welding bolt 19 in front, deviating from the horizontal plane. Then, the drive shaft 11 would be displaced by its own weight.

In order to prevent this, the work space to the left of the piston can be set under pressure such that the piston-cylinder unit 29 applies a counterforce to the drive shaft 11 in direction R which approximately or exactly compensates the displacement force caused by the weight of the drive shaft. For this, it is necessary that the level of the force applied to the drive shaft 11 via the piston-cylinder unit 29 can be varied, which is achieved by providing one or more servo-hydraulic or servo-pneumatic valves, for example.

If the welding device is turned around and held with the welding bolt 19 in front directed upward (overhead welding) the weight of the drive shaft 11 would force the drive shaft 11 into the starting position. This means that high electric energy is required so as to enable the electromagnetic linear drive 5 to move the drive shaft 11 in forward direction V. Said electric energy is reduced, for example, in that the work space in the cylinder to the right of the piston 33 is set under higher pressure than the left work space so that the piston-cylinder unit compensates the weight of the drive shaft 11 or at least supports the movement in forward direction V.

After the surface of the work piece has been maneuvered the welding voltage is applied and the drive shaft 11 is distance-controlled so as to move a defined distance in direction R to a target or intermediate position. An arc is generated by means of lift ignition. In order to produce a high welding quality it is necessary that the distance between the work piece and the welding bolt is as precise as possible. Moreover, it is advantageous that the welding bolt can be moved to said target position as quickly as possible so as to keep the cycle time short. When the drive shaft 11 is moved in direction R to said target position, a certain pressure is built up in both work spaces so that the piston-cylinder unit 29 acts as a hydraulic or pneumatic dampener. This prevents the drive shaft 11 from slowly oscillating into the target position; at least such behavior is highly reduced. Therefore, the target position is approached quickly and precisely.

The drive shaft 11 can remain in said target position. The piston-cylinder unit 29 holds the drive shaft 11 in position so that the coils 9 are currentless. The piston-cylinder unit 29 and the coils 9 are controlled again via the control unit 23. This aspect of the method can also be designed such that a minor force is applied by the piston 33 in direction R and an identical counterforce is applied by the linear drive 5 in forward direction V.

When the drive shaft 11 is moved in forward direction V by actuating the linear drive 5 such movement is preferably distance-controlled. The bolt 19 dips into the melt and is mounted to the work piece. Before the drive shaft 11 is moved, the cylinder must be switched to a depressurized state. The cylinder is in a depressurized state when the drive shaft 11 is on the horizontal plane and the welding tool is not moved, but when the drive shaft 11 is slanted relative to the horizontal plane, the piston-cylinder unit 29 can be controlled such that it compensates the weight of the drive shaft 11 so that less electric driving energy is required even for moving forward.

In summary, the bolt-welding device operating according to the above described method offers the following substantial advantages:

The linear drive 5 for the drive shaft 11 can be disconnected in any position to be held for a certain time or the flow of current can be reduced causing the overall heat development to decrease.

When the drive shaft is slanted relative to the horizontal plane the piston-cylinder unit is controlled accordingly so as to counteract the weight of the drive shaft including the parts coupled to said shaft, which also reduces the heat development because the linear drive 5 requires less electric energy.

The reproducibility of the welding process improves in all positions because the weight of the drive shaft 11 is compensated by the piston-cylinder unit 29.

The piston-cylinder unit 29 is used as a dampening device for positioning the drive shaft 11 and causes the transient behavior to be minimized when the drive shaft 11 is positioned.

The piston-cylinder unit 29 is preferably a pneumatic unit because an even lower resistance can be achieved for moving the drive shaft 11 and the piston 33 with a pneumatic unit than with a hydraulic unit where the pressure fluid has to be displaced.

Figure 2:
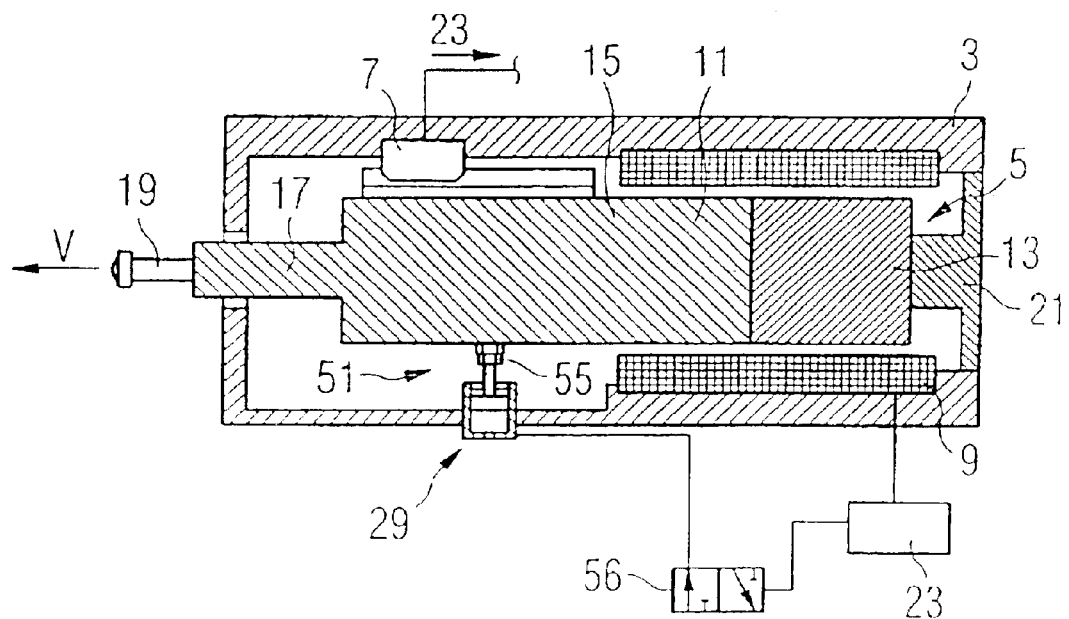
FIG. 2 is an axial section through a second embodiment of the bolt-welding device of the invention, also operating in accordance with the method of the invention.

Functionally, the embodiment shown in FIG. 2 substantially corresponds to that shown in FIG. 1, and the parts described above have the same reference numbers, provided that they have the same function.

In the embodiment according to FIG. 2, the device, which is also switchable and which generates a force by creating a structural path of flux between the housing 3 and the drive shaft 11, is a clamping device 51. Said clamping device 51 has a hydraulic or pneumatic piston-cylinder unit coupled with a valve 56 which is connected to a control unit 23. In addition, the clamping device 51 has a press-on flange 55 with a rubber coating mounted on the free end of the piston rod. In contrast to the unit 29 in FIG. 1, the clamping device 51 acts in a radial direction relative to the forward direction V, not parallel to the forward direction V, i.e. in a radial direction relative to the drive shaft 11 as well. When the piston rod is extended the coating of the press-on flange 55 pushes against the outside circumferential area of the drive shaft 11 in area 15.

Depending on the level of the force applied by the clamping device 51, the clamping device 51 can clamp the drive shaft 11 in a desired position or it can cause such friction that a certain resistance is exerted against a displacement of the drive shaft 11 so that the clamping device 51 acts as a dampening device that minimizes the oscillation of the drive shaft 11 when it is in a slanted position relative to the horizontal plane or minimizes the transient behavior of the drive shalt 11 in a target position.

In order to make the most of the above possibilities the level of the force applied to the drive shaft 11 must be varied which is possible by means of a servo pressure control valve.

The clamping device 51 can be configured such that a piston acting on both sides is provided in that the work spaces on both sides of the piston are supplied with compressed air or hydraulic fluid. It can also be advantageous to provide a piston that acts on one side only, specifically a piston acting in the direction of the drive shaft 11. In this case; the restoring force is provided by a spring disposed between a lent face of the cylinder and the piston.

The clamping device 51 does not necessarily have to be mounted on the housing 3. It can also be mounted on the drive shaft 11. In this case, the piston rod is extendable until it pushed against the housing 3. In this context the term housing again includes a part mounted on the housing or a stationary part.

Also, and this applies to the embodiment of FIG. 1 as well, the coils 9 can be mounted on the drive shaft 11 surrounded by one or more ring-shaped permanent magnets mounted on the housing.

The embodiment shown in FIG. 2 operates like the one shown in FIG. 1 so that the following description of the method of operation can be shortened.

In the starting position shown in FIG. 2, the control unit 23 ensures that no current flows through the coils 9. The valve 56 is driven accordingly so as to move the piston upward until the press-on flange 55 pushes against the drive shaft 11 clamping it into position. The frictional force thus generated counteracts a displacement of the drive shaft in forward direction V.

After the delivery to the work piece the piston rod is moved downward if the drive shaft 11 is on the horizontal plane during delivery. A voltage is applied to the coils 9 and the drive shaft 11 moves in forward direction V until it contacts the surface of the work piece. The drive shaft 11 then moves back by a certain controlled distance and is then in the intermediate position.

It can be advantageous for the clamping device 51 to generate a certain brake force in the return. This is intended to minimize or fully prevent that the drive shaft 11 oscillates into the intermediate position. For this, only a certain brake force (fictional force) is generated by the piston moving upward. The force is not as strong as when the drive shall 11 is fixed in a position. As soon as the waiting position has been reached the clamping force is increased so that the drive shaft 11 is held securely in position by the clamping device 51. The coils 9 are now currentless.

After the arc ignition the clamp is eliminated and the welding bolt is moved in forward direction V by means of the linear drive 5.

Even when the drive shaft is in a slanted position, the clamping device 51 can always be used such that the drive shaft 11 is securely held in position.

When, as in the embodiment of FIG. 2, for example, the piston-cylinder unit clamps the drive shaft 11 and the rubber coating on the press-on flange 55 abuts on the drive shaft 11, the electric energy flowing through the coils 9 is reduced. This can be achieved, for example, by increasing the so-called position tolerance range of the drive shaft (also called control window) stored in the control unit 23. Normally, during the welding process and positioning a deviation of position of only ±0.1 mm is allowed for the drive shaft 11, and the coils readjust immediately when the deviation from the position increases. When the drive shaft 11 is clamped, a certain axial displacement may occur because of the elasticity of the rubber, but this is acceptable. Therefore, the position tolerance range is increased to ±5 mm, for example, which means, although minimal readjustments will be made, even when the drive shaft remains within the tolerance range, the electric energy is considerably lower because of the increase in the tolerance range. This is the reason why the bolt-welding device does not heat up as much as it would with the lower tolerance range.

It should also be pointed out that the drive shaft 11 could be moved in direction R by means of the piston-cylinder unit 29 in FIG. 1 so that less or no current flows through the coils 9 when moving in direction R.

The positioning of the drive shaft 11 by means of the piston-cylinder unit or generally, by means of the switchable device is also applicable to a bolt-welding device where the movement in direction V takes place via a pre-loaded spring. Again, the linear drive would be relieved when the spring is preloaded and the positioning is achieved by means of the switchable unit.

The outgoing air of the piston-cylinder unit 29, or clamping device 51 can also be used for cooling the coils 9, 9' or compressed air can be supplied to the coils 9, 9' when they heat up excessively.

What is claimed is:

1. A method for welding a bolt (19) to a work piece using a bolt-welding device comprising a housing (3), at least one drive shaft (11) proximate the housing (3), and at least one electromagnetic linear drive (5) having at least one coil (9) for moving the drive shaft (11) in an axial direction, said method comprising the steps of:
   positioning the drive shaft (11) in a forward direction relative to the workpiece; and
   applying a switchable force during said positioning step between the drive shaft (11) and the housing (3) acting against displacement of the drive shaft (11) relative to the housing (3).

2. The method as set forth in claim 1 further including the step of:
   returning the drive shaft (11) to a starting position by applying the switchable force to the drive shaft (11) after said positioning step.

3. The method as set forth in claim 2 further including the step of:
   holding the drive shaft (11) in an intermediate position by applying the switchable force to the drive shaft (11) wherein the intermediate position is between the starting position and an end position defined by a fully extended drive shaft (11).

4. The method as set faith in claim 3 further including the step of:
   varying the switchable force during said applying step.

5. The method as set forth in claim 4 wherein the step of applying the switchable force is further defined as applying the switchable force such that when the drive shaft (11) is directed downward and/or upward with the bolt (19) in front the switchable force compensates a displacement force caused by a weight of the drive shaft (11).

6. The method as set forth in claim 4 wherein the step of applying the switchable force is further defined as applying the switchable force at least when the drive shaft (11) is slanted relative to a horizontal plane.

7. The method as set forth in claim 6 further including the step of detecting the position of the drive shaft (11) relative to the horizontal plane using a position measuring system (7).

8. The method as set forth in claim 1 wherein the step of positioning the drive shaft (11) relative to the workpiece further includes the steps of moving the drive shaft (11) toward a predetermined target position and connecting the switchable force while the drive shaft (11) moves toward the predetermined target position.

9. A method for welding a bolt (19) to a work piece using a bolt-welding device comprising a housing (3), at least one drive shaft (11) proximate the housing (3), and at least one electromagnetic linear drive (5) having at least one coil (9) for moving the drive shaft (11) in an axial direction, said method comprising the steps of:
   positioning the drive shaft (11) relative to the workpiece, wherein the step of positioning the drive shaft (11) relative to the workpiece further includes the steps of moving the drive shaft (11) toward a predetermined target position and connecting the switchable force while the drive shaft (11) moves toward the predetermined target position;
   applying a switchable force to the drive shaft (11) when positioning the drive shaft (11) wherein the switchable force exerts a resistance against displacement of the drive shaft (11) relative to the housing (3), at least in a forward direction V; and
   supplying the linear drive (5) with less electric energy when the switchable force is connected than when the switchable force is not connected.

10. A method as set forth in claim 9 further including the step of supplying the linear drive (5) with no or with low electric energy when the switchable force fixes the drive shaft (11) in the starting position.

11. A method as set forth in claim 10 further including the step of increasing a position tolerance range stored in a control system of the bolt-welding device for the linear drive (5) when the switchable force holds or fixes the drive shaft (11) in position.

12. A method as set forth in claim 11 wherein the step of applying the switchable force is further defined as generating a clamping force between the drive shaft (11) and the housing (3).

13. A method as set forth in claim 12 wherein the step of applying the switchable force is further defined as applying the switchable force to the drive shaft (11) transversely to the forward direction (V) of the linear drive.

14. A method as set forth in claim 11 wherein the step of applying the switchable force is further defined as applying a switchable force using a hydraulic, pneumatic or electric drive.

15. A method as set forth in claim 14 wherein the step of applying the switchable force is further defined as applying the switchable force to the drive shaft (11) opposite the forward direction (V) of the linear drive (5).

16. A method as set forth in claim 15 further including the step of apportioning the switchable force relative to the forward direction (V) of the linear drive (5) such that it performs a dampening function when the drive shaft (11) is moved to a target position.

17. A bolt-welding device for connecting a bolt (19) to a work piece, comprising:
- a housing (3);
- at least one drive shaft (11) movable relative to said housing (3);
- at least one linear drive (5) acting in an axial direction with at least one coil (9), wherein said linear drive (5) moves said drive shalt (11) relative to said housing (3); and
- a switchable device operative between said drive shaft (11) and said housing (3) for applying a force to said drive shaft (11) which exerts a resistance against a displacement of said drive shaft (11) at least in a forward direction (V).

18. A bolt-welding device as set forth in claim 17 wherein said switchable device is further defined as a clamping device (51) acting transversely to said drive shaft (11).

19. A bolt-welding device as set forth in claim 17 wherein said switchable device is further defined as a dampening device acting in forward direction (V) and/or in an opposite direction (R).

20. A bolt-welding device for connecting a bolt (19) to a work piece, comprising:
- a housing (3);
- at least one drive shaft (11) movable relative to said housing (3); and
- at least one linear drive (5) actin in an axial direction with at least one coil (9), wherein said linear drive (5) moves said drive shaft (11) relative to said housing (3);
- a switchable device operative between said drive shaft (11) and said housing (3) for applying a force to said drive shaft (11) which exerts a resistance against a displacement of said drive shaft (11) at least in a forward direction (V), wherein said switchable device includes a piston-cylinder unit (29).

21. A bolt-welding device as set forth in claim 20 wherein said piston-cylinder unit (29) is hydraulically actuated.

22. A bolt-welding device as set forth in claim 20 wherein said piston-cylinder unit (29) is pneumatically actuated.

23. A bolt-welding device as set forth in claim 20 wherein said switchable device includes a valve (55) coupled to said piston-cylinder unit (29).

24. A bolt-welding device as set forth in claim 23 wherein said valve (55) is further defined as a servo-valve.

25. A bolt-welding device as sot forth in claim 20 further including an electric drive for driving said bolt-welding device.

26. A bolt-welding device as set forth in claim 20 further including a control unit (23) for controlling said coil (9) and said bolt-welding device.

27. A bolt-welding device as set forth in claim 26 further including a position measuring system (7) coupled to said control unit (23).

28. A bolt-welding device as set forth in claim 27 further including at least one permanent magnet (13) coupled to said drive shaft (11) and projected into said coil (9).

29. A bolt-welding device as sot forth in claim 28 wherein said linear drive (5) has at least two connected coils (9) wound in opposite direction and said at least one permanent magnet (13) is coupled with said drive shaft (11) and projected into said coils (9).

30. A bolt-welding device as set forth in claim 29 wherein said bolt-welding device is adapted to vary the resistance exerted by said switchable device.

* * * * *

UNITED STATES PATENT AND TRADEMARK OFFICE
CERTIFICATE OF CORRECTION

PATENT NO. : 6,825,434 B2
DATED : November 30, 2004
INVENTOR(S) : Jürgen Madsak, Ulrich Citrich and Steffen Hailer It is certified that error appears in the above-identified patent and that said Letters Patent is hereby corrected as shown below:

Column 7,
Line 64, please delete "faith" and insert -- forth --.

Column 9,
Line 31, please delete "actin" and insert -- acting --.

Column 10,
Lines 15 and 27, please delete "sot" and insert -- set --.

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,825,434 B2
DATED : November 30, 2004
INVENTOR(S) : Jürgen Madsak, Ulrich Citrich and Steffen Hailer It is certified that error appears in the above-identified patent and that said Letters Patent is hereby corrected as shown below:

Column 7,
Line 64, please delete "faith" and insert -- forth --.

Column 9,
Line 31, please delete "actin" and insert -- acting --.

Column 10,
Lines 15 and 27, please delete "sot" and insert -- set --.

Signed and Sealed this

Fourteenth Day of June, 2005

JON W. DUDAS
*Director of the United States Patent and Trademark Office*